Patented Oct. 27, 1953

2,657,193

UNITED STATES PATENT OFFICE 2,657,193

RESINOUS CONDENSATION PRODUCTS FROM AN ALDEHYDE OR KETONE WITH A CHROMAN, THIACHROMAN, COUMARAN, OR BENZODIHYDRO-THIAFURAN

Herman S. Bloch, Chicago, and Howard E. Mammen, Riverside, Ill., assignors to Universal Oil Products Company, Chicago, Ill., a corporation of Delaware No Drawing. Application April 16, 1951,
Serial No. 221,322

9 Claims. (Cl. 260—67)

This application is a continuation-in-part of our copending application Serial No. 757,911, filed June 28, 1947, now abandoned.

This invention relates to the production of new compositions of matter broadly characterized as resinous condensation products which are useful as resin bases in the formulation of paints and varnishes and in compounding a variety of coating and molding compositions. More specifically, the invention concerns the production of resinous products by the condensation of a carbonyl compound selected from the group consisting of the aldehydes and ketones with a polycyclic compound containing a benzene ring attached by two of its nuclear bonds in ortho relationship to each other to a saturated heterocyclic ring containing an element selected from the group consisting of oxygen and sulfur.

It is the primary object of the invention to produce synthetic resins useful per se as molding materials and also as components of various coating compositions such as paints and varnishes.

Another object of the invention is to produce thermoplastic resins which have a hard, water-resistant surface, a relatively high degree of elasticity, and which dissolve in organic solvents commonly utilized as various paint, varnish and lacquer solvents to thereby produce effective coating compositions.

Still another object of the invention is to provide a simplified single stage procedure for the production of useful resinous condensation products.

In one of its embodiments, the present invention relates to a process for producing a resinous material which comprises reacting at condensation reaction conditions a carbonyl compound selected from the group consisting of the aldehydes and ketones with a polycyclic compound containing an aromatic ring attached by two of its nuclear bonds in ortho relationship to each other to a saturated heterocyclic ring containing an element selected from the group consisting of oxygen and sulfur.

In accordance with a more specific embodiment thereof, the invention comprises reacting an alkyl chroman with an aromatic aldehyde at a temperature of from about 50° to about 150° C. and in the presence of a concentrated mineral acid catalyst.

The products of the present process are in general characterized as thermoplastic type resins containing arylcarbinol groups formed by the condensation of the heterocyclic reactant and the carbonyl compound involved in the present process. The mechanism of the condensation is believed to be similar to the proposed mechanism of the initial stages in the formation of phenol-aldehyde resins, wherein thermoplastic initial condensation products are obtained containing hydroxyarylcarbinol groups. Although the reaction is believed to proceed via the mechanism proposed above, it is not intended to confine the scope or application of the present invention to products formed strictly in accordance with the recited reaction mechanism.

The reactant herein specified as a polycyclic compound containing an aromatic ring attached by two of its nuclear bonds in ortho relationship to each other to a saturated heterocyclic ring containing at least one element selected from the group consisting of oxygen and sulfur in its ring structure is a member of a group of compounds having one of the following general structural formulae:

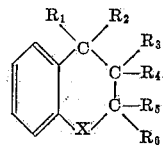

and

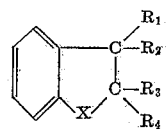

wherein $R_1$ to $R_6$ may be selected from the group consisting of hydrogen, alkyl, alkenyl, cycloalkyl, phenyl, and other hydrocarbon substituents, and X is selected from the group consisting of oxygen and sulfur. The heterocyclic compounds utilizable as reactants are thus members of the classes of compounds characterized as the chromans (benzodihydropyrans) and the substituted chromans which are the oxygen analogs containing a six-membered heterocyclic saturated ring, the thiachromans (benzodihydrothiapyrans) and their substituted derivatives which are the sulfur analogs containing a six-membered heterocyclic saturated ring, the coumarans (benzodihydrofurans) and the substituted chromans which are the oxygen analogs of the five-membered saturated heterocyclic rings, and the benzodihydrothiafurans containing a five-membered saturated heterocyclic ring attached to the benzo nucleus. In each instance the reactant contains a saturated heterocyclic ring which accounts for the specific reactivity displayed in the present condensation reaction.

Typical representative compounds of the coumaran and substituted coumaran series useful as reactants in the condensation reaction include such compounds as 2,3-dihydrobenzofuran, 2,3-dimethyldihydrobenzofuran, 2,2 - dimethyldihydrobenzofuran, 3,3-dimethyldihydrobenzofuran, and homologs thereof in which the alkyl substituents on the heterocyclic ring contain up to about 5 carbon atoms per substituent. Other coumarans utilizable as reactants include the compounds containing alkyl, alkenyl, cycloalkyl and phenyl substituents as well as other diverse radicals, such as halo, nitro, carboxyl, sulfo, amino, cyano and other radicals on the carbocyclic ring or aromatic portion of the chroman molecule, as for emaxple 2,3-dimethyl-4-chlorobenzodihydrofuran, and other compounds. Other typical compounds representative of the alternative sulfur analogs and the five-membered saturated heterocyclic analogous ring compounds (the thiachromans, the chromans and the benzodihydrothiafurans) utilizable as reactant monomers in the present condensation reaction are, for example, 2,2 - dimethylbenzodihydropyran, 3,4 - dimethylbenzodihydropyran, 2,3 - dipropylbenzodihydrothiafuran, 3-vinyl-4-butylbenzodihydrothiapyran and other members of the present series of compounds. The chromans and especially their alkyl and alkenyl derivatives, may be obtained from natural sources and in many cases may be prepared synthetically. One process for the production of the preferred alkyl chromans involves the condensation of a phenol with a conjugated diolefin, an allene, or an acetylene in the presence of an acid-acting catalyst such as a strong mineral acid, including sulfuric, phosphoric, hydrochloric, etc., acids; a Friedel-Crafts metal halide catalyst, such as anhydrous aluminum chloride, aluminum bromide, zinc chloride, ferric chloride, etc., or preferably, an etherate, ketonate, alcoholate, or other organic complex thereof; or boron fluoride or its analogous complexes. The condensation is usually carried out at temperatures of from about 25° to about 200° C. and preferably at a superatmospheric pressure, generally above about 2 atmospheres.

The carbonyl compound utilized as a reactant in the present process which is condensed with the above specified polycyclic reactant containing a heterocyclic ring is more specifically characterized as an aldehyde or a ketone selected from the aliphatic saturated or unsaturated members or the cyclic aromatic or cycloaliphatic series. The aliphatic saturated and unsaturated aldehydes of both branched and straight chain configuration are represented by such compounds as formaldehyde, acetaldehyde, isobutyraldehyde and acrolein, crotonaldehyde, tiglicaldehyde, respectively. Cyclic aldehydes which include not only the aromatic compounds, but also the saturated and unsaturated cycloaliphatic species may be represented by such compounds as benzaldehyde, cinnamaldehyde, of the former group and cyclopentenal, furfural, cyclohexanal, etc. of the latter group. Of the ketones utilizable as a suitable carbonyl reactant in the present process, the saturated and unsaturated ketones having either branched chain or straight chain configuration may be employed, including such typical ketones of these classes, as acetone, methylethyl ketone, methylisopropyl ketone, etc., methylvinyl ketone, divinyl ketone, mesityl oxide, phorone, etc.

The cyclic ketones utilizable herein as another class as carbonyl reactant which successfully condense with the heterocyclic compounds hereinabove specified to yield a resinous condensation product include the mono- and poly-nuclear aryl ketones containing saturated and/or unsaturated aliphatic side chains such as acetophenone, benzophenone, benzalacetophenone, phenylacetonaphthone, etc. as well as the cycloalkyl ketones, such as cyclohexanone, isophorone and cyclopentylmethylketone. The aldehydes and ketones may further be employed in admixture with each other or with other members of the same group, as for example, mixtures of acetophenone, and methylvinylketone. The carbonyl reactants may also contain diverse radicals attached to the carbon atom structure of the aldehyde or ketone reactant which thereby introduce various modifications in the properties of the ultimate resinous condensation product. Such other radicals may be selected from one or more of the following group: halo, hydroxyl, nitro, amino, alkoxy, acyloxy, carboxyl, sulfo, etc. radicals, which, although they do not enter directly into the condensation reaction with the heterocyclic compound, nevertheless affect the melting point, solubility and other physical characteristics of the resin by introducing such radicals into the structure of the resin and imparting chemical properties thereto which are associated with the above radicals. Thus, an aromatic aldehyde may also contain hydroxy radicals, as in the case of vanillin, or one or more amide radicals, as in 2,4-acetaminobenzaldehyde, etc.

The substituents appearing in the structure of either the heterocyclic or carbonyl reactant, in general, modify the melting point, solubility in various solvents, hardness, and elasticity of the final resinous product. When the substituent is an unsaturated hydrocarbon radical, such as an alkenyl group (butenyl, pentenyl and the like groups) the resulting condensation product is capable of undergoing secondary polymerization, thus introducing a further modifying factor in the physical and chemical properties of the final resinous product, generally the hardness and elasticity of the resin. The presence of other radicals, such as hydroxyl and amino groups on the carbon atom structure of the reactants and particularly on the polycyclic reactant, causes secondary condensation effects between the aldehyde or keto group of the carbonyl reactant and the amino radical, for example. By exercising a choice of suitable radicals on the reactants employed in the present condensation reaction, the product may be varied through a wide range of physical properties and also any desired combination of physical properties may be obtained by selecting the proper substituents.

The physical properties of the final condensation reaction product may also be modified by employing a mixture of the carbonyl compound and heterocyclic reactant with other aldehyde-reactive materials, as for example, a phenol, an amino or amido compound, such as urea, melamine, a sulfonamide, one or more amines, such as phenylenediamine and the like, a polycyclic aromatic hydrocarbon such as naphthalene or its homologs, anthracene or its homologs, and the like, and other materials of similar activity. When utilizing the latter aldehyde-reactive material in admixture with the heterocyclic reactant, it may be necessary or expedient to add the more reactive aldehyde-reacting material after partial condensation of the heterocyclic reactant with the carbonyl reactant has already occurred, as for example after the reaction has progressed for several minutes.

The condensation reaction is desirably conducted in the presence of certain catalytic agents generally characterized as strong mineral acids including such acids as the hydrohalo acids, sulfuric acid, phosphoric acid, etc., preferably of relatively high concentration, above about 20% of the acid. The use of more dilute acids as catalyst results in the formation of oily rather than of solid, condensation products under the conditions described. When utilized, the mineral acid is added directly to the reaction mixture in sufficient quantity and/or concentration to result in a reaction mixture having an acidity above about 20% (in the aqueous phase) and preferably, in the case of sulfuric acid, below about 65%, since at higher concentrations of catalyst the reaction product is rather dark. The catalyst may be substantially removed from the resinous reaction product by contacting the same after the condensation has proceeded to the desired stage with a solvent which has a selective solubility for the catalyst, such as water which may contain an alkali or ammonium hydroxide and which has no solvent action on the organic resin.

Under certain conditions of reaction and when utilizing certain types of reactants, it is desirable to conduct the reaction in the presence of an inert solvent for one or more of the reactants. The solvent may be selected from the aliphatic alcohols, such as methyl, ethyl, propyl, butyl, etc. alcohols, ethers, or hydrocarbons, such as benzene, toluene, butane, hexane, a petroleum fraction such as a distillate cut of a paraffinic gasoline, etc. The solvent tends to modify the rate of reaction and the physical properties of the product obtained from the condensation reaction, the product, in general, being lighter in color than when the solvent is absent.

The resin-forming reaction of the present invention may generally be initiated at temperatures generally below about 200° C. and above about 50° C., although in the case of some starting materials, the reaction temperature may be as low as about 30° C. and as high as about 250° C. Pressures higher than superatmospheric pressures need not generally be utilized except in the case of low boiling or volatile reactants and solvents.

The proportion of the heterocyclic reactant in the reaction mixture to the carbonyl reactant is generally and preferably equimolar. It has been observed that when the ratio of carbonyl to heterocyclic reactant is less than equimolar, the resinous condensation product is usually a soft, semi-solid resinoid and by increasing the proportion of carbonyl reactant in the reaction mixture up to a molar ratio of from about 1.5 to 1 to about 2 to 1, the product becomes progressively harder and more brittle. For most purposes in which the present resinous condensation product is utilized, it is generally preferred that the product possesses a high-luster surface and a high impact resistance; it is therefore desirable in such preparations that a greater than equimolar ratio of carbonyl reactant to heterocyclic reactant be employed in the reaction mixture, generally not greater than about 3:1.

The resinous condensation product formed in the present invention has a wide field of utility, especially in the formulation of lacquers, adhesives, coating compositions, such as paints and varnishes, molding compositions, etc. One of the outstanding uses of the resin is in the preparation of coating compositions, such as lacquers, paints and varnishes where the resin is dissolved in a suitable solvent to form a lacquer or composited with a drying oil and pigment to form a paint composition. The resins are soluble in various organic solvents, such as the alcohols, ethers, and in low molecular weight ketones, such as acetone, in certain esters such as ethyl or butyl acetate, and most of the resins are soluble in drying oils of the hydrocarbon and the unsaturated fatty acid glyceride type. The products are of the thermoplastic type of resin and therefore may be conveniently molded into variously shaped articles by the application of pressure and heat in a suitable molding apparatus. The products are usually practically colorless except for a slight amber shade and when molded separately, produce a translucent plastic-like product. The resin may be utilized to impregnate porous material such as cellulosic products, including paper or shaped wooden articles, or the resin may be heated with wood flour, wood chips, cotton linters, asbestos or other fibrous material to form rigid to semi-rigid structural shapes.

The following examples are introduced for the purpose of illustrating the process of this invention; the examples are not intended, however, to define the scope of the invention in accordance with the reactants, conditions or reaction or procedure specified therein.

EXAMPLE I 2-methylchroman was prepared by the reaction of phenol with butadiene at 115° C. in the presence of liquid 100% phosphoric acid, the butadiene being bubbled through a mixture of the phenol and acid maintained at approximately the above temperature. An alkali-isoluble portion of the product (29% yield based upon the phenol present in the reaction mixture) was distilled to separate 2-methylchroman therefrom, B. P. 225° C.

The chroman as prepared above was mixed with formaldehyde in a molecular ratio of 1 mole of chroman per 1.5 mole of formaldehyde, in the form of 36% formalin. To the mixture was added 43% by weight of 69% sulfuric acid and the mixture stirred for 2 hours while heating to a temperature of 120° C. The product was washed with dilute aqueous caustic and dried, the resin having a slight amber color and a hard, shiny surface. When ground to a powder and mixed with wood fluor, it molded into hard, high tensile strength disks at 150° C. and 1000 pounds per square inch pressure.

EXAMPLE II

A mixed resin was prepared by reacting 15.7 grams of methyl chroman with 5.0 grams of formaldehyde, in the form of 36% formalin, in the presence of 41% sulfuric acid at 110° C. for 1.5 hours. After this the reaction mixture was cooled to 60° C., 1.85 grams of phenol was added thereto, and the temperature was then raised to 110° C. and maintained at that value for 0.5 hour. The resulting product was a smooth, hard, cream-colored resin, which, upon dehydration, became hard and porous and appeared to be thermosetting.

A portion of the resin thus produced was ground to a fine powder and was dry mixed with two parts of wood flour. This mixture was then placed in a mold and formed into disks at various pressures and temperatures as shown in the following table.

Table I.—Preparation of molded disks

| Time in Minutes | Temp., °C. | Pressure, p. s. i. | Description |
|---|---|---|---|
| 20 | 130 | 1,000 | Disk medium hard-brown. |
| 5 | 140 | 1,000 | Disk medium hard-dark brown. |
| 5 | 150 | 1,000 | Disk very hard-dark brown. |
| 5 | 165 | 1,000 | Material charred-black. |

The disks made at 1000 p. s. i. g. pressure and at 150° C. were most satisfactory because, although they were dark in color, they were stronger than the disks prepared at lower temperatures.

We claim as our invention:

1. A process for the production of a resinous product which comprises reacting at condensation reaction conditions a carbonyl compound selected from the group consisting of the aldehydes and the ketones with a polycyclic compound having a structural formula selected from the group consisting of

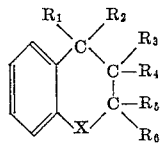

and

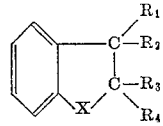

wherein $R_1$ to $R_6$ are selected from the group consisting of hydrogen and saturated hydrocarbon substituents and X is selected from the group consisting of oxygen and sulfur.

2. The process of claim 1 further characterized in that said reaction is effected at a temperature of from about 50° to about 200° C.

3. The process of claim 1 further characterized in that said reaction is effected in the presence of an aqueous solution of a mineral acid containing from about 20 to about 85% of said acid.

4. The process of claim 1 further characterized in that said polycyclic compound is an alkylchroman.

5. The process of claim 1 further characterized in that said polycyclic compound is a methylchroman.

6. The process of claim 1 further characterized in that said polycyclic compound is a benzodihydrothiapyran.

7. The process of claim 1 further characterized in that the molal ratio of carbonyl compound to polycyclic compound in said reaction is from about 1:1 to about 3:1.

8. The resinous condensation product of formaldehyde and methylchroman.

9. The resinous condensation product of a carbonyl compound selected from the group consisting of aldehydes and ketones and a polycyclic compound having a structural formula selected from the group consisting of

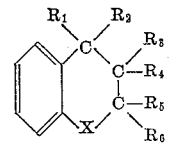

and

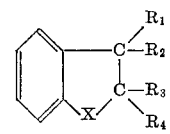

wherein $R_1$ to $R_6$ are selected from the group consisting of hydrogen and saturated hydrocarbon substituents and X is selected from the group consisting of oxygen and sulfur.

HERMAN S. BLOCH.
HOWARD E. MAMMEN.

References Cited in the file of this patent

UNITED STATES PATENTS

| Number | Name | Date |
|---|---|---|
| 2,059,850 | Coolidge | Nov. 3, 1936 |
| 2,395,739 | Hersberger | Feb. 26, 1946 |
| 2,460,724 | Allen | Feb. 1, 1949 |
| 2,469,472 | Nachod | May 10, 1949 |
| 2,474,612 | Barney | June 28, 1949 |